106-84
6/28/83 XR 4,390,166

United States Patent [19] [11] 4,390,166
Danjo et al. [45] Jun. 28, 1983

[54] HOT-GUNNING METHOD FOR REPAIRING CONVERTERS

[75] Inventors: Hiroyuki Danjo; Kazuaki Takimoto, both of Okayama; Gensuke Muta; Nobuyoshi Hiroki, both of Ibaraki, all of Japan

[73] Assignees: Shinagawa Refractories Co., Ltd., Tokyo; Sumitomo Metal Industries Co., Ltd., Osaka, both of Japan

[21] Appl. No.: 188,867

[22] Filed: Sep. 19, 1980

Related U.S. Application Data

[63] Continuation-in-part of Ser. No. 39,824, May 17, 1979, abandoned.

[30] Foreign Application Priority Data

May 29, 1978 [JP] Japan ................................ 53/64031

[51] Int. Cl.[3] ......................... C21C 5/44; C04B 35/04

[52] U.S. Cl. ......................................... 266/44; 106/84; 501/109

[58] Field of Search ......................... 266/44, 280, 281; 106/84; 501/109; 264/30

[56] References Cited

U.S. PATENT DOCUMENTS

| | | | |
|---|---|---|---|
| 3,124,471 | 3/1964 | Spetzler et al. | 264/30 |
| 3,193,402 | 7/1965 | Rusoff et al. | 106/84 |
| 3,229,970 | 1/1966 | Henry | 266/280 |
| 3,333,840 | 8/1967 | Weaver et al. | 106/58 |
| 3,340,075 | 9/1967 | Stoddard et al. | 501/109 |
| 3,355,528 | 11/1967 | Henry | 106/58 |
| 3,427,369 | 2/1969 | Parsons | 264/30 |
| 3,552,984 | 1/1971 | Martinet et al. | 106/58 |
| 3,600,480 | 8/1971 | Parsons | 264/30 |
| 3,667,974 | 6/1972 | Umeya et al. | 106/58 |
| 3,737,489 | 6/1973 | Murton | 264/30 |
| 3,897,256 | 7/1975 | Murton | 106/84 |

FOREIGN PATENT DOCUMENTS

| | | | |
|---|---|---|---|
| 6914186 | 9/1969 | Netherlands | 264/30 |
| 1130383 | 10/1968 | United Kingdom | 106/58 |

OTHER PUBLICATIONS

Schuhmann, Jr., "Laboratory Sizing", *Powder Metallurgy,* Published by ASM, Cleveland, Ohio, 1942, p. 186.

*Primary Examiner*—Peter K. Skiff
*Attorney, Agent, or Firm*—Birch, Stewart, Kolasch & Birch

[57] ABSTRACT

The present invention relates to a hot-gunning method for repairing converters which comprises the step of: gunning a composition onto the lining of the converter, the composition including,
(a) 8–15% by weight water;
(b) 20–40% by weight of pellets prepared by mixing 40–60% by weight of magnesia clinker powder containing more than 75% by weight of MgO and having a particle size of less than 1 mm with 60–40% by weight of molten tar and dropping the resulting mixture into water or cooled air; and
(c) the substantial balance of said composition being a refractory material selected from the group consisting of magnesia clinker, dolomite clinker, chrome ore and mixtures thereof.

6 Claims, No Drawings

HOT-GUNNING METHOD FOR REPAIRING CONVERTERS

CROSS REFERENCE TO RELATED APPLICATIONS

This application is a continuation in part of copending application Ser. No. 39,824 filed on May 17, 1979, abandoned.

BACKGROUND OF THE INVENTION

1. Field of the Invention

The present invention relates to a hot-gunning method for repairing converters.

An object of the present invention is to provide an epochal hot-gunning method for repairing converters for extending the life of the lining bricks and for reducing the original amount of the material to be gunned.

2. Description of the Prior Art

Recently the life of the lining of a converter is not only determined by the durability of the lining bricks but is also greatly influenced by the slag control (a steel producing method wherein the basicity of the slag is adjusted in the refining step) and the use of a material to be gunned or baked onto the lining bricks.

Particularly, the amount of the material to be gunned used has increased so quickly as to approach the original unit of bricks today.

Generally, the mechanism by which the gunned material is deposited on the lining bricks is presumed to be that a deposited layer of the gunned material physically adheres first to the lining brick surface (internal surface of the converter), reacts by furnace heat or the like to be sintered with the lining brick surface, and is further made to react also with various compounds of the slag to form a strong hard sintered layer.

Generally, however, since the conventional material to be gunned contains 15 to 20% by weight water, there are defects created at the time that the gunned material physically adheres to the lining bricks. Because of the high temperature of the furnace, the water in the gunned material is gasified and expands so quickly that the bonding force is impaired and the gunned material peels off early during the work and will not perform its inherent function very well.

In order to solve such problems, there have been already suggested inventions mostly to improve the binder. For example, a hot-gunning refractory material is mentioned in the publication of Japanese Patent Laid Open No. 26206/1973, a refractory composition is mentioned in the publication of Japanese Patent Publication No. 27049/1967, a method of hot-repairing furnace walls of converters and the like is mentioned in the publication of Japanese Patent Laid Open No. 127413/1977 and a dry hot-repairing gun material is mentioned in the publication of Japanese Patent Laid Open No. 154818/1977. However, these compositions have not yet perfectly solved the above described problems.

The invention of the refractory composition mentioned in the publication of Japanese Patent Publication No. 27049/1967 is made of a refractory composition (mostly a material to be gunned) consisting of substantially non-acid refractory granules, 2 to 12% of solid pitch granules having a softening point of at least 200° F. (about 933° C.) and having such a granule diameter that substantially all the amount passes through a 4-mesh sieve and a substantial amount is retained on a 100-mesh sieve, 0.05 to 4% of a plasticizer and 0.5 to 5% of a water-soluble cold setting bonding component. However, there are defects in that the solid pitch is so comparatively fine that it is melted by the furnace heat within a very short time and therefore the gunned material deposited on the furnace wall will flow away together with the molten pitch before being sintered.

Furthermore, the method of hot-repairing furnace walls of converters and the like mentioned in the publication of Japanese Patent Laid Open No. 127413/1977 relates to a method wherein refractory granules, which are covered on the surfaces thereof with a high melting point pitch have less than several % of a pitch of the same quality granulated to a diameter of 0.3 to 2.0 mm added and mixed, are gunned by means of a normally used dry-gun. However, there are defects in that the required steps of covering the granules with the pitch and granulating the pitch are complicated and thus elevate the cost.

SUMMARY OF THE INVENTION

As a result of researching the above described problems and to eliminate the defects, the present inventors have discovered that, as a property of the material to be gunned on the lining bricks bonded or impregnated with a tar, the material to be gunned which contains a binder of the same quality forms the strongest and hardest sintered layer.

Therefore, the subject matter of the present invention is a hot-gunning method for repairing converters characterized in that the material to be gunned contains pellets obtained by kneading a refractory powder in a molten tar and dropping the resultant mixture into water or cooled air having a temperature of 0° to 40° C.

The pellets are added in an amount of 20 to 40% by weight of the total weight of the material to be gunned, in the presence of 8 to 15% by weight of water, by means of a dry-gun.

The present invention shall be explained in detail in the following description.

The first feature of the present invention is to use a material to be gunned to which pellets prepared in advance by mixing a refractory powder in a molten tar and dropping said mixture into water or cooled air are added by 20 to 40% by weight of the total weight of the material.

The pellets are made by uniformly mixing in a molten tar 40 to 60% by weight of a magnesia type refractory powder consisting of a fine powder of at least 75% MgO having a granule diameter of at most 1 mm normally used for the general material to be gunned. As another refractory material, one or more of a general dolomite clinker made as a fine powder having a granule diameter of at most 1 mm and a chromium ore having a diameter of at most 1 mm can be used as required in the composition.

If the amount of the refractory powder composition in the pellets is less than 40% by weight, the amount of tar will be so much that, even if it is gunned on the lining brick surface at a high temperature, it will not adhere, but will flow away. There is also a defect that, when more than 60% by weight of refractory powder is used, it will be hard to produce pellets. Therefore, it is preferable to use a tar wherein the refractory power is present in a range of 40 to 60% by weight of the total composition. The pellets may be generally spherical but may also be elliptical or flat as required.

Therefore, the material to be gunned in the present invention is a material prepared by uniformly kneading 20 to 40% by weight of the above mentioned magnesia type pellets with 20 to 40% by weight of coarser granules of a diameter of 0.5 to 3.0 mm of a magnesia clinker of the same quality as of the refractory powder contained in said pellets which are crushed by a well known means so as to form a refractory aggregate (coarse granules and fine powder), 30 to 50% by weight of a fine powder of the magnesia clinker of a granule diameter up to 0.3 mm, further 0.5% by weight (on the gross weight) of a binder such as sodium silicate which can be easily prepared in a general production equipment.

In the conventional method, generally 15 to 20% by weight water is added, and therefore peeling off, as is described above, occurs and the durability (the degree of how long the gunned material can be used and generally represented by the number of charges) of the gunned material is reduced. However, in the present invention, 8 to 15% by weight water may be added and therefore the well known dry-gun can be used.

If the amount of added water is less than 8% by weight, the water cooling effect will be so short that the tar in the pellets will be quickly softened by the furnace heat, will be melted, and will flow away. Therefore, the deposited amount of the gunned material will be reduced. If the amount of added water exceeds 15% by weight, such peeling off as is described above will occur and the durability of the gunned material will be reduced. Therefore, the above mentioned range is preferable.

According to the method of the present invention, the material gunned onto the lining bricks of a converter at a high temperature, generally at 1200° to 1300° C., will adhere to the lining brick surface due to the action of sodium silicate which is added in advance and any other well known binder and, at the same time, the tar in the pellets will melt. However, since fine granules (of 1 mm at most) of a magnesia clinker are added in advance to the pellets, the tar will not flow away but will penetrate into the fine powder in the gunned material and the structure of the lining bricks and the deposited layer of the gunned material will be sintered integrally into the same structure with the lining bricks to form a strong hard sintered layer.

Further, the amount of water added in the dry-gun may be so much smaller when compared to the conventional method that the generation of vapor by the quick expansion of water will be negligible. Therefore, the initial adherence of the gunned material will not be impaired, therefore, no initial peeling off of the deposited layer will occur. Also, the spalling or slaking of the lining bricks will be much less than in the conventional method.

Also, there are advantages in that, as the tar is blown in the form of pellets, as mixed with water, into the converter at a high temperature, it will not ignite and burn to produce black smoke before it is deposited on a damaged part of the converter and the material can be gunned to any desired thickness even on the trunnion side.

As detailed above, by working the present invention, the durability of the gunned material can be improved (to about twice as high as in the conventional method), the original amount of the gunned material can be reduced (to about 40% of that in the conventional method) and therefore the life of the lining bricks can be extended (to about 1.2 times as long as in the conventional method). Therefore, the contribution of the present invention to the steel manufacturing industry is very significant.

EXAMPLE

Pellets used for preparing a refractory gunning material used in the process of this invention were produced in the following manner:

One part by weight of a molten liquid (240° C.) of pitch, where the softening point is 120° C., was added and mixed with 1.2 parts by weight of magnesia clinker fine particles (which consist of 45% by weight of 35–150 mesh particles, 35% by weight of 150–325 mesh particles and 20% by weight of less than 325 mesh particles). The obtained mixture was dropped, under stirring, into water having a temperature of about 20° C. (room temperature) through a dispersing plate having 5 mm diameter openings therein thereby obtaining pellets.

The present invention is further illustrated by the following working Example. (See Table below.)

In the Table, the durability was judged by observing with a naked eye the gunned material deposited after the tapping, as generally practiced in the industry.

| | | Present Invention | Conventional Method |
|---|---|---|---|
| | | Object to be repaired | |
| | | Furnace abdomen part of 250-ton converter | Furnace abdomen part of 250-ton converter |
| Material used to be gunned | Raw material (in % by weight) | Magnesia type pellets: 30 [Refractory powder (of a granule diameter of 1 mm: 55 Tar (of a softening point of 120° C.): 45] | |
| | | Magnesia type coarse granules (of 0.5 to 3.0 mm): 30 | Magnesia type coarse granules (of 0.7 to 2.38 mm): 57 |
| | | Magnesia type fine powder (0.3 mm at most): 40 | Magnesia type fine powder (0.7 mm at most): 38 |
| | | Binder | Clay: 5 |

-continued

| | Present Invention | Conventional Method |
|---|---|---|
| | Object to be repaired | |
| | Furnace abdomen part of 250-ton converter | Furnace abdomen part of 250-ton converter |
| | (sodium silicate): 0.5 (on the gross wt) | Binder sodium silicate): 5 (on the gross wt) |
| Gun | Well known dry gun | Well known dry gun |
| Amount of addition of water (in % by weight) | 10 | 18 |
| Gunned deposited rate (in % by weight) | 95 | 85 |
| Durability (in % by volume) After 1 charge earning work | 90 | 80 |
| After 2 charge | 80 | 40 |
| After 3 charge | 60 | 10 |
| After 4 charge | 40 | 0 |
| Original unit of gunned material (kg/ton of steel) | 40 | 100 |

The invention being thus described, it will be obvious that the same may be varied in many ways. Such variations are not to be regarded as a departure from the spirit and scope of the invention, and all such modifications as will be obvious to one skilled in the art are intended to be included within the scope of the following claims.

What is claimed is:

1. A hot-gunning method for repairing a converter lined with bricks which comprises the steps of:
   providing a composition comprising:
   (a) 8–15% by weight of water;
   (b) 20–40% by weight of a pellet prepared by mixing 40–60% by weight of magnesia type refractory powder containing more than 75% by weight of MgO and having a particle size of not more than 1 mm with 60–40% by weight of molten tar and dropping the resulting mixture into water or cooled air; and
   (c) the substantial balance of said composition comprising a refractory material selected from the group consisting of magnesia clinker, dolomite clinker, chrome ore and mixtures thereof, and a binder; and
   gunning said composition onto the lining of said converter at a high temperature.

2. A hot-gunning method according to claim 1, wherein said refractory material is magnesia clinker present in an amount of 20–40% by weight of the composition of coarse granules and 30–50% by weight of the composition of fine powder.

3. A hot-gunning method according to claim 2, wherein said coarse granules have a particle size of 0.5 to 3.0 mm and said fine powder has a particle size of up to 0.3 mm.

4. The method of claim 1, wherein the water or cooled air into which the mixture of refractory powder and molten tar is dropped has a temperature of from 0° to 40° C.

5. A hot-gunning method according to claim 1, wherein said binder is sodium silicate.

6. A hot-gunning method according to claim 1, wherein said composition is gunned onto the lining bricks of said converter at a temperature of 1200° to 1300° C. to thereby form a strong hard sintered layer integral with said lining bricks.

* * * * *